United States Patent [19]

Kinoshita et al.

[11] Patent Number: 5,581,435
[45] Date of Patent: Dec. 3, 1996

[54] POLYESTER FILM CAPACITOR ELEMENT

[75] Inventors: Shin-ichi Kinoshita, Machida; Naohiro Takeda, Yokohama, both of Japan

[73] Assignee: Diafoil Company, Limited, Tokyo, Japan

[21] Appl. No.: 792,218

[22] Filed: Nov. 8, 1991

[30] Foreign Application Priority Data

| Nov. 8, 1990 | [JP] | Japan | 2-304853 |
| Jan. 30, 1991 | [JP] | Japan | 3-10087 |
| May 23, 1991 | [JP] | Japan | 3-118763 |
| May 16, 1991 | [JP] | Japan | 3-111944 |

[51] Int. Cl.$^6$ ............ H01G 4/32; B05D 5/12
[52] U.S. Cl. ............ 361/301.5; 361/301.4; 361/312; 361/320; 361/321.1; 361/511; 361/512; 361/513; 361/514; 361/515; 361/530; 361/531; 427/79; 427/81; 427/177; 427/322; 427/393.5; 427/407.1; 427/419.1; 428/423.7; 428/458; 428/461; 428/480; 428/500
[58] Field of Search ............ 427/79, 419.1, 427/393.5, 81, 250, 404, 322, 177, 407.1; 428/480, 458, 461, 500, 423.7; 361/301.5, 301.4, 511–515, 530, 531, 312.313, 320, 321.1

[56] References Cited

U.S. PATENT DOCUMENTS

| 4,005,238 | 1/1977 | Gaehde et al. | 427/404 |
| 4,039,722 | 8/1977 | Dickie et al. | 427/404 |
| 4,216,246 | 8/1980 | Iwasaki et al. | 427/404 |
| 5,089,347 | 2/1992 | Hart | 427/250 |

FOREIGN PATENT DOCUMENTS

0348062A1  12/1989  European Pat. Off. .

OTHER PUBLICATIONS

Database WPIL, Section Ch, Week 2185, Derwent Publications Ltd., London, GB; Class A, AN 85-125275 & JP-A-60 063 151 (Toray Ind. Inc.) 11 Apr. 1985.

Database WPIL, Section Ch, Week 1384, Derwent Publications Ltd., London, GB; Class A, An 84-077611 & JP-A-59 028 319 (Matsushita Elec. Ind. KK) 15 Feb. 1984. Abstract.

*Primary Examiner*—Janyce Bell
*Attorney, Agent, or Firm*—David G. Conlin; George W. Neuner; Milton Oliver

[57] ABSTRACT

A film capacitor element produced from a metallized polyester film is described. In the metallized polyester film, the adhesion between a vapor-deposited metal layer and a polyester substrate is improved by providing a coating layer comprising a specific water soluble or water dispersible resin. The film capacitor produced by the use of the metallized polyester film has good moist heat resistance and long term stability in performance.

10 Claims, No Drawings

POLYESTER FILM CAPACITOR ELEMENT

BACKGROUND OF THE INVENTION

The present invention concerns a metallized polyester film capacitor. More in particular, the present invention relates to a metallized polyester film capacitor having excellent moist heat resistance made by the use of a film having an improved adhesion between a substrate film and a vapor-deposited metal.

Since polyester films are excellent, for example, in mechanical property, heat resistance and electric property, they are generally used as elements fabricated by winding two polyester films which are vapor-deposited with a metal such as Al or Zn, or fabricated by laminating a plurality of such films and then cut into chips. With the progress in various kinds of electric devices and equipments in recent years, improvement for the characteristics of the polyester film capacitors has been intended. One of the requirements for the improvement of the characteristics is moisture resistance and heat stability for a long period of time. That is, the metallized polyester film has a drawback that the adhesion between the substrate film and the vapor-deposited metal, in particular, the adhesion under high temperature and high humidity atmosphere is poor to bring about a problem that if a capacitor is put under a high temperature and high humidity condition, moisture permeates through the interface between the substrate film and the vapor-deposited metal thereby changing the static capacitance of the capacitor with elapse of time. Accordingly, improvement has been demanded for moist heat resistance of the capacitor from a viewpoint of a long term stability.

There have been disclosed a film capacitor having a vinylidene chloride coating layer in Japanese Patent Application Laid-Open (KOKAI) No. 60-115214 and a film capacitor having a coating layer containing melamine and/or urea resin as the essential ingredient in Japanese Patent Application Laid-Open (KOKAI) No. 60-120511, respectively, as the capacitor of excellent moist heat resistance.

However, even if the resin composition as disclosed in the above-mentioned publications is used, the performance of the capacitor can not be maintained sufficiently in a moist and high temperature circumstance. Further, along with remarkable development for various kinds of electronic equipments in recent years, demand for the long term reliability required for a capacitor, in particular, the long term moisture and heat stability of a capacitor performance has been increased further.

SUMMARY OF THE INVENTION

The feature of the present invention resides in a metallized polyester film capacitor element produced by winding or stacking a metallized polyester film or a plurality of the metallized polyester films, the metallized polyester film being produced by the following steps of:

coating a coating solution containing a resin as the main ingredient at least on one surface of a polyester film to obtain a film having a coating layer at least on one surface of the film, the average center line surface roughness (Ra) of the coating layer being in the range from 0.005 to 0.5 µm; and vapor-depositing a metal on the surface of the coating layer to obtain the metallized polyester film.

DETAILED DESCRIPTION OF THE INVENTION

The polyester for the polyester film in the present invention is a polyethylene terephthalate in which not less than 80% of the constitutional repeating unit is ethylene terephthalate, a polyethylene naphthalate in which not less than 80 mol % of the constitutional repeating unit is ethylene naphthalate or poly-1,4-cyclohexane dimethylene terephthalate in which not less than 80 mol % of the constitutional repeating unit is 1,4-cyclohexane dimethylene terephthalate. The intrinsic viscosity of the polyester is preferred to be in the range from 0.4 to 1.2.

As the copolymerizable component other than the components described above, there can be used, for example, a diol component such as diethylene glycol, propylene glycol, neopentyl glycol, polyethylene glycol or polytetramethylene glycol; a dicarboxylic acid component such as isophthalic acid, 2,6-naphthalane dicarboxylic acid, 5-sodiumsulfoisophthalic acid, adipic acid, azelaic acid, sebacic acid or an ester-forming derivative thereof and a hydroxy monocarboxylic acid such as hydroxy benzoic acid and an ester-forming derivative thereof.

The polyester film in the present invention may include additive particles, deposited particles and other catalyst residues that form protrusions at the surface of the film in such an amount as not deteriorating the capacitor characteristic to be described later. Further, it may also contain, as additives other than the protrusion-forming agent, antistatic agent, stabilizer, lubricant, crosslinking agent, antiblocking agent, antioxidant, colorant, light shielding agent or UV absorber, as necessary, in such an amount as not deteriorating the capacitor characteristic.

The coating layer in the present invention is obtained by coating a coating solution containing a water soluble or water dispersible resin as the main ingredient at least on one surface of a polyester film, and, subsequently stretching the resultant coated film at least in one direction of machine and transverse directions and heat-setting. The water soluble or water dispersible resin usable herein may properly be selected from polyester polyurethane, a resin mainly comprising a polyester type resin with a glass transition point (Tg) of not higher than 70° C., a resin comprising a polyester component and an acryl component, and a resin containing a polyurethane or polyester and an epoxy compound.

The polyester polyurethane usable in the present invention is prepared by reacting a polyester polyol and a polyisocyanate in accordance with a usual method.

The polyester polyol is obtained by reacting a dicarboxylic acid and a glycol in accordance with a usual method. As the dicarboxylic acid component, there can be used, for example, an aromatic dicarboxylic acid such as terephthalic acid, isophthalic acid and 2,5-naphthalene dicarboxylic acid, aliphatic dicarboxylic acid such as adipic acid, azelaic acid and sebacic acid, hydroxycarboxylic acid such as hydroxybenzoic acid, or an ester-forming derivative thereof. As the glycol component, there can be used an aliphatic glycol such as ethylene glycol, 1,4-butanediol, diethylene glycol and triethylene glycol, an alicyclic glycol such as 1,4-cyclohexane dimethanol, an aromatic diol such as p-xylenediol, or a poly(oxyalkylene) glycol such as polyethylene glycol, polypropylene glycol, polytetramethylene glycol. The saturated polyesterpolyol mentioned above has a linear structure but it may be formed into a branched polyesterpolyol by using tri or higher valent ester forming component.

As the polyisocyanate compound, there can be mentioned, for example, hexamethylene diisocyanate, diphenylmethane diisocyanate, tolylene diisocyanate, isophorone diisocyanate, an adduct of tolylene diisocyanate with trimethylpropane and an adduct of hexamethylene diisocyanate with trimethylolethane. Among them, a polyester polyurethane coating agent obtained by using an aromatic diisocyanate such as isophorone diisocyanate and tolylene diisocyanate is particularly preferred since it is excellent in stretching follow-up property and the resultant coating is strong and excellent in the adhesion with a vapor-deposited metal layer.

The polyester polyurethane usable in the present invention is preferably used as a coating agent using water as a medium in view of safety and sanitation but it may contain an organic solvent as a dispersion agent for a polyester polyurethane within the scope of the present invention.

In a case of using water as the medium, the polyester polyurethane may be forcibly dispersed therein with the aid of a surface active agent, but the use of a self-dispersible type in which a hydrophilic nonionic group such as polyethers or a cationic group as described in Japanese Patent Publication (KOKOKU) No. 63-12890 is bonded to a polyester polyurethane is preferred and, the use of a self-dispersible type in which an anionic group is bonded to a polyester polyurethane as described in Angew. Makromol. Chem., 98, 133–165 (1981) is more preferred.

The polyester polyurethane having the anionic group can be prepared by a method of using a compound having an anionic group as the polyurethane forming component such as a polyol, polyisocyanate compound and a chain extender, a method of reacting unreacted isocyanate group in the resultant polyester polyurethane with a compound having an anionic group or a method of reacting a group having an active hydrogen in polyester polyurethane with a specific compound.

In the method of using the compound having the anionic group as the polyurethane forming component, it is possible to use, for example, a compound obtained by sulfonating an aromatic isocyanate compound, diaminocarboxylate and sulfuric ester salt of amino alcohols.

In the method of reacting the unreacted isocyanate group in the polyester polyurethane and the compound having the anionic group, it is possible to use, for example, bisulfite, aminosulfonic acid and its salts, aminocarboxylic acid and its salts, sulfuric acid ester of amino alcohols and its salts, hydroxyacetic acid and its salts.

In the method of reacting the group having the active hydrogen in the polyester polyurethane and the specific compound, it is possible to use a 3-membered to 7-membered cyclic compound having a group capable of forming a salt or a group capable of forming a salt after ring opening such as dicarboxylic anhydride, tetracarboxylic anhydride, sultone, lacton, epoxycarboxylic acid, epoxysulfonic acid, 2,4-dioxooxazolidine, isatoic anhydride, phoston, and carbyl sulfate.

By using a compound having the anionic group as the polyester polyol, an anionic group can also be introduced into the polyester polyurethane. The polyester polyol having the anionic group is obtained by bonding a compound having a sulfonate group or a carboxylate group to a polyester polyol by means of copolymerization or graft.

Anionic group of the polyester polyurethane is properly selected, for example, from sulfonic acid group carboxylic acid group, phosphoric acid group, and lithium salt, sodium salt, potassium salt or ammonium salt thereof.

The amount of the anionic group in the polyester polyurethane is preferably from 0.05% by weight to 8% by weight. If the amount of the anionic group is less than 0.05% by weight, the water solubility or the water dispersibility of the polyester polyurethane is poor, whereas if the amount of the anionic group exceeds 8% by weight, water proofness of the primer layer after coating may be deteriorated or films may stick to each other by moisture absorption or the adhesion under high temperature and high humidity may be reduced.

The polyester type resin as the water soluble or water dispersible resin usable in the present invention has a glass transition point (Tg) of not higher than 70° C., preferably, 0° to 60° C. and, further preferably, 5° to 50° C. If Tg of the polyester type resin exceeds 70° C., adhesion between a polyester film and the vapor-deposited metal may sometimes become poor. Further, if Tg of the polyester type resin is excessively low, films coated with a coating solution may stick to each other to reduce the operation efficiency.

As examples of the components constituting the polyester type resin, the following polybasic carboxylic acids and polyhydroxy compounds can be mentioned. That is, as the polybasic carboxylic acid, there can be used terephthalic acid, isophthalic acid, o-phthalic acid, phthalic acid, 4,4'-diphenyldicarboxylic acid, 2,5-naphthalenedicarboxylic acid, 2,6-naphthalene dicarboxylic acid, 1,4-cyclohexanedicarboxylic acid, 2-potassium sulfoterephthalic acid, 5-sodium sulfoisophthalic acid, adipic acid, azetaic acid, sebacic acid, dodecane dicarboxylic acid, glutaric acid, succinic acid, trimellitic acid, trimesic acid, trimellitic anhydride, phthalic anhydride, p-hydroxybenzoic acid, trimellitic acid mono potassium salt or an ester-forming derivative thereof. As the polyhydroxy compound, there can be used ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexanedimethanol, p-xylylene glycol, an adduct of bisphenol A and ethylene glycol, diethylene glycol, triethylene glycol, polyethylene glycol, polypropylene glycol, polytetramethylene glycol, polytetramethylene oxide glycol, dimethylolpropionic acid, glycerin, trimethylolpropane, sodium dimethylolethylsulfonate and potassium dimethylolpropionate.

The polyester type resin with the glass transition point within the above-mentioned range is synthesized by properly selecting one or more of the compounds described above and by means of an ordinary polycondensation method.

The polyester type resin in the present invention may be used as a coating agent using an organic solvent as the medium but it is preferred to be used as a coating agent using water as a medium in view of safety and sanitation. In a case of using water as the medium, the polyester type resin may be forcibly dispersed by the aid of a surface active agent or the like. However, the use of a self-dispersible type having a hydrophilic nonionic group such as polyethers or cationic group such as quaternary ammonium salt is preferred, and, the use of a water soluble or water dispersible polyester type resin having an anionic group, is more preferred.

The polyester having the anionic group is prepared by bonding a compound having the anionic group to a polyester by means of copolymerization or graft. The anionic group is properly selected from sulfonic acid group, carboxylic acid group, phosphoric acid group or their lithium salt, sodium salt, potassium salt or ammonium salt.

The amount of the anionic group in the polyester type resin is preferably from 0.05% to 8% by weight. If the amount of the anionic group is less than 0.05% by weight, the water solubility or the water dispersibility of the polyester type resin is poor. On the other hand, if the amount of the anionic group exceeds 8% by weight, the water proofness of the primer layer after coating is deteriorated or the films may stick to each other by absorption of moisture or the adhesion under high temperature and high humidity is deteriorated.

The resin comprising the polyester component and the acryl component as the water soluble or water dispersible resin usable in the present invention is a mixture of a polyester resin and an acrylic resin, or a resin having the polyester moiety and the acryl moiety in one molecule.

The resin comprising the polyester component and the acryl component in the present invention includes, preferably, (1) a resin comprising (a) a mixture of a polyester type resin and acrylic resin and/or (b) a reaction product of a polymerizable compound having carbon-carbon unsaturated bond (acryl component) And a polyester type resin as the main ingredient, (2) a resin comprising (a) a polyester type resin and (b) a reaction product of a polymerizable compound having a carbon-carbon unsaturated bond (acryl component) and a polyester type resin as a main ingredient, or (3) a resin comprising (a) acrylic resin and (b) a reaction product of a polymerizable compound having carbon-carbon unsaturation double bond (acryl component) and a polyester type resin as the main ingredient.

As the component constituting the polyester type resin in the present invention, the components referred to in the previous description for the polyester type resin can be used. The polyester polyurethane in which the chain of the polyester polyols is extended by isocyanate can also be used.

The acrylic resin usable in the present invention is preferably a resin comprising an alkyl acrylate or alkyl methacrylate as the main ingredient. The coating film-forming property, strength of the coating film and the blocking resistance can be improved by setting the sum for the components of the alkyl acrylate and alkyl methacrylate to not less than 50 mol %, more preferably, not greater than 60 mol %. As the substituent alkyl group for the alkyl acrylate and the alkyl methacrylate, there can be mentioned, for example, methyl group, ethyl group, n-propyl group, iso-propyl group, n-butyl group, isobutyl group, t-butyl group, 2-ethylhexyl group, lauryl group, stearyl group and cyclohexyl group.

As the copolymerizing component other than the main component described above, use of a vinyl monomer having a functional group is recommended for improving the adhesion of a substrate polyester film and vapor-deposited metal. As a preferred functional group, there can be mentioned, for example, carboxyl group or its salt, acid anhydride group, amide group, hydroxy group, epoxy group, amino group which may be substituted or its salt, alkylolamino group or its salt. Specific examples of such vinyl monomer are shown below.

Carboxylic acid such as (meth)acrylic acid, itaconic acid, maleic acid, fumaric acid, crotonic acid and metal salts or ammonium salts thereof; a monoester of the carboxylic acid above with a monohydric alcohol; an adduct of hydroxyalkyl esters of $\alpha,\beta$-unsaturated carboxylic acid such as
2-hydroxyethyl (meth)acrylate,
2-hydroxypropyl (meth)acrylate,
3-hydroxypropyl (meth)acrylate,
2-hydroxybutyl (meth)acrylate,
3-hydroxybutyl (meth)acrylate,
4-hydroxybutyl (meth)acrylate,
3-chloro-2-hydroxypropyl (meth)acrylate,
di-2-hydroxyethyl fumarate,
mono-2-hydroxyethyl monobutyl fumarate and polyethylene glycol monomethacrylate, with anhydride of a polybasic carboxylic acid such as maleic acid, succinic acid, phthalic acid, hexahydrophthalic acid, tetrahydrophthalic acid, benzenetricarboxylic acid, benzentetracarboxylic acid, tetrachlorophthalic acid and dodecylsuccinic acid; a compound having amide group or alkylolamine group such as (meth)acrylamide, N-methylmethacrylamide, methylol methacrylamide, ureide vinyl ether and ureide ethyl acrylate; a compound having amino group or alkylolamino group such as diethylaminoethyl vinyl ether,
2-aminoethyl vinyl ether,
3-aminopropyl vinyl ether,
2-aminobutyl vinyl ether,
dimethylaminoethyl methacrylate and
dimethylaminoethyl vinyl ether; a quaternary ammonium salt prepared from the compound having amino group or alkylolamino group recited above and a halogenated alkyl, dimethyl sulfuric acid or sultone; hydroxyalkyl esters of $\alpha,\beta$-unsaturated carboxylic acid such as
2-hydroxyethyl (meth)acrylate,
2-hydroxypropyl (meth)acrylate,
3-hydroxypropyl (meth)acrylate,
4-hydroxybutyl (meth)acrylate,
3-chloro-2-hydroxypropyl (meth)acrylate,
di-2-hydroxyethyl fumarate,
mono-2-hydroxyethyl-monobutyl fumarate and
polyethylene glycol monomethacrylate; and a compound having an epoxy group such as glycidyl (meth)acrylate, (2-methyl)glycidyl (meth)acrylate and (meth)acrylglycidyl ether.

In addition to the compound as described above, it is also possible to use, in combination, (meth)acrylonitrile, styrene, butyl vinyl ether, mono- or dialkyl ester of maleic acid, mono- or dialkyl ester of fumaric acid, mono- or dialkyl ester of itaconic acid, methyl vinyl ketone, vinyl chloride, vinylidene chloride, vinyl acetate, vinyl pyridine, vinyl pyrrolidone, N-vinyl succinimide, N-vinyloxazolidone, silicone monomer such as vinyltrimethoxy silane, phosphorous atom-containing vinyl monomer such as 2-(meth)acryloyloxyethyl acid phosphate and a conjugated diene compound such as butadiene.

A polymer having the acrylic unit such as a copolymer of polyester and polyacryl and a copolymer of silicone and polyacryl can be also used as the acrylic resin.

The reaction between the compound having the carbon-carbon unsaturated bond and a polyester type resin is conducted by mixing a polyester type resin dispersed or dissolved in water or a solvent with a compound having carbon-carbon unsaturation bond, and using a polymerization initiator such as hydrogen peroxide, benzoyl peroxide, t-butyl peroxide, di-t-butyl peroxide, acetyl peroxide, azobisisobutyronitrile, cumene hydroperoxide, ammonium persulfate, potassium persulfate, 2,2-azobisaminomethane, 2,2-azobisaminoethane, hydrogen chloride salt or sulfate salt thereof and ammonium ceric nitrate or a photopolymerization initiator such as 2-hydroxy-2-methyl-1-phenylpropan-1-one and 1-(4-isopropylphenyl)-2-hydroxy-2-methylpropan-1-one.

The blending ratio between the acrylic resin and the polyester type resin and the ratio of the polymerizable compound having the carbon-carbon unsaturation bond and the polyester type resin in the reaction product is such that the ratio of the polyester type resin is within a range, preferably from 5 to 95% by weight, more preferably, 10 to 85% by weight and, particularly preferably 20 to 80% by weight. If the ratio of the polyester type resin is less than 5% by weight, the adhesion to the polyester film or the strength of coating film may be deteriorated. On the other hand, if it exceeds 95% by weight, the effect of the acrylic resin and the compound having the carbon-carbon unsaturation bond cannot be expected so much and, when the film is wound into a roll, blocking is caused between the primer layer and the polyester film or between the primer layers to each other to cause practical problem.

The coating agent containing the resin comprising the acrylic component and the polyester component in the present invention may be a coating agent using a solvent as the medium but it is preferably a coating agent using water as the medium in view of safety and sanitation. In a case of using water as the medium, the resin comprising the acrylic component and the polyester component may be compulsorily dispersed with the aid of a surface active agent or the like. However, the use of a self dispersion type resin having a hydrophilic nonionic group such as polyethers or a cationic group such as a quaternary ammonium salt group is preferred, and the use of a water soluble or water dispersible resin having an anionic group is more preferred.

The water soluble or water dispersible resin having the anionic group is obtained by bonding a compound having an anionic group to the resin by means of copolymerization or graft. The anionic group can be properly selected from sulfonic acid group, carboxyl group, phosphoric acid group and lithium salt, sodium salt, potassium salt or ammonium salt thereof.

The amount of the anionic group in the resin comprising polyester component and acryl component is preferably from 0.05% by weight to 8% by weight. If the amount of the anionic group is less than 0.05% the water solubility or water dispersibility of the resin is poor. On the other hand, if the amount of the anionic group exceeds 8% by weight, the water proofness of the primer layer after coating is deteriorated or films stick to each other by absorption of moisture to deteriorate the adhesion under high temperature and high humidity.

The water soluble or water dispersible resin may further include those containing polyurethane or polyester and epoxy compound. The polyurethane is preferably a water soluble or water dispersible polyurethane having a carboxyl group or its salt on the side chain thereof. The preferred polyester is a water soluble or water dispersible polyester having a carboxyl group or its salt on the side chain thereof. The epoxy compound is preferred to have two or more epoxy group.

The carboxyl group or its salt in the polyurethane or polyester (hereinafter simply referred to as the carboxyl group) is a hydrophilic functional group for improving the solubility or dispersibility to water and is a functional group capable of reacting with an epoxy group.

The content of the carboxyl group in the polyurethane or polyester is preferably from 1 to 8% by weight. If the content of the carboxyl group is less than the above-mentioned range, the hydrophilic property of the polyurethane or the polyester becomes insufficient making it some time difficult to prepare the coating solution. On the other hand, if it is more than the above-mentioned range, the water proofness of the resultant coating film may some time be poor.

The polyurethane may be prepared by reacting a polyhydroxy compound and a polyisocyanate compound in accordance with a usual method.

As the polyhydroxy compound, there can be mentioned, for example, polyethylene glycol, polypropylene glycol, polyethylene-propylene glycol, polytetramethylene glycol, hexamethylene glycol, tetramethylene glycol, 1,5-pentanediol, diethylene glycol, triethylene glycol, polycaprolactone, polyhexamethylene adipate, polyhexamethylene sebacate, polytetramethylene adipate, polytetramethylene sebacate, trimethylolpropane, trimethylolethane, pentaerythritol and glycerin.

As the polyisocyanate compound, there can be mentioned, for example, hexamethylene diisocyanate, diphenylmethane diisocyanate, tolylene diisocyanate, isophorone diisocyanate, an adduct of tolylene diisocyanate with trimethylolpropane, and an adduct of hexamethylene diisocyanate with trimethylolethane.

The carboxyl group can be introduced easily to the side chain of the polyurethane by a method, for example, of using a carboxyl group-containing polyhydroxy compound as one of starting polyhydroxy compounds or reacting a hydroxy group-containing carboxylic acid or an amino group-containing carboxylic acid to the unreacted isocyanate group in the polyurethane and then adding the reaction product in an aqueous alkaline solution for neutralization under a vigorous stirring. As the carboxyl group-containing polyhydroxy compound, there can be mentioned, for example, dimethylolpropionic acid, dimethylolacetic acid, dimethylolvaleric acid and bis(ethylene glycol) ester of trimellitic acid. As the hydroxy group-containing carboxylic acid, there can be mentioned, for example, 3-hydroxypropionic acid, γ-hydroxybutyric acid, p-(2-hydroxyethyl)benzoic acid, malic acid or the like. As the amino group-containing carboxylic acid, there can be mentioned, for example, β-aminopropionic acid, γ-amino-butyric acid or p-aminobenzoic acid.

As the polyester, either of saturated or unsaturated polyesters may be used.

As the dicarboxylic acid component for the saturated polyester, there can be used, for example, an aromatic dicarboxylic acid such as terephthalic acid, isophthalic acid and 2,5-naphthalene dicarboxylic acid; an aliphatic dicarboxylic acid such as adipic acid, azelaic acid and sebacic acid; a hydroxycarboxylic acid such as hydroxybenzoic acid; and ester forming derivatives thereof. As the glycol component, there can be used, for example, an aliphatic glycol such as ethylene glycol, 1,4-butanediol, diethylene glycol and triethylene glycol; an alicyclic glycol such as 1,4-cyclohexane dimethanol, an aromatic diol such as p-xylenediol, and a poly(oxyalkylene) glycol such as polyethylene glycol, polypropylene glycol and polytetramethylene glycol.

The saturated polyester described above has a linear structure but it may be formed into a branched polyester by using a tri- or higher valent ester forming component.

On the other hand, as the unsaturated polyester, there can be mentioned, for example, the followings.

(1) An unsaturated polyester having a copolymerizable unsaturated group in the polymer chain obtained by reacting a starting compound containing a copolymerizable unsaturated group with other starting compound as disclosed in Japanese Patent Publication (KOKOKU) No. 45-2201, 46-2050, 44-7134, Japanese Patent Application Laid-Open (KOKAI) No. 48-78233 and 50-58123.

(2) An unsaturated polyester obtained, as disclosed in Japanese Patent Publication (KOKOKU) No. 49-47916 and 50-6223, by preparing a saturated polyester, and subsequently adding to the saturated polyester a vinyl monomer, for example as shown below, having a functional group reactive with a functional group such as a hydroxy group or carboxyl group in the saturated polyester:

(a) a compound having an epoxy group and a vinyl group such as glycidyl (meth)acrylate, (b) a compound having an alkoxysilanol group and an vinyl group such as vinylmethoxy silane and (meth)acryloxyethyl trimethoxysilane, (c) a compound having an acid anhydride group and a vinyl group such as maleic anhydride and tetrahydrophthalic anhydride, (d) a compound having an isocyanate group and a vinyl group such as an equimolar adduct of 2-hydroxypropyl (meth)acrylate and hexamethylene diisocyanate.

The carboxyl group can be easily introduced to the side chain of the saturated or unsaturated polyester described above, for example, by a method of reacting a dioxane compound having a carboxylic group with the polyester as disclosed in Japanese Patent Laid-Open (KOKAI) No. 61-228030, a method of radical graft of an unsaturated carboxylic acid to the polyester as disclosed in Japanese Patent Laid-Open (KOKAI) No. 62-225510, a method of reacting the polyester and a halogenoacetic acid to introduce a carboxylic group on the aromatic ring as disclosed in Japanese Patent Laid-Open (KOKAI) No. 62-225527 or a method of reacting the polyester and a polybasic carboxylic anhydride as disclosed in Japanese Patent Laid-Open (KOKAI) No. 62-240318.

The pair ion to the carboxylic group in the polyurethane and the polyester in the present invention is preferably a monovalent ion. In particular, a hydrogen ion or an amine type onium ion containing ammonium ion is preferred.

The epoxy compound crosslinks with the polyurethane or polyester having the carboxyl group on the side chain to enhance the adhesion with the vapor-deposited thin metal layer. As the epoxy compound having two or more groups, there can be mentioned, for example, the following aliphatic epoxy compounds (a)–(k).

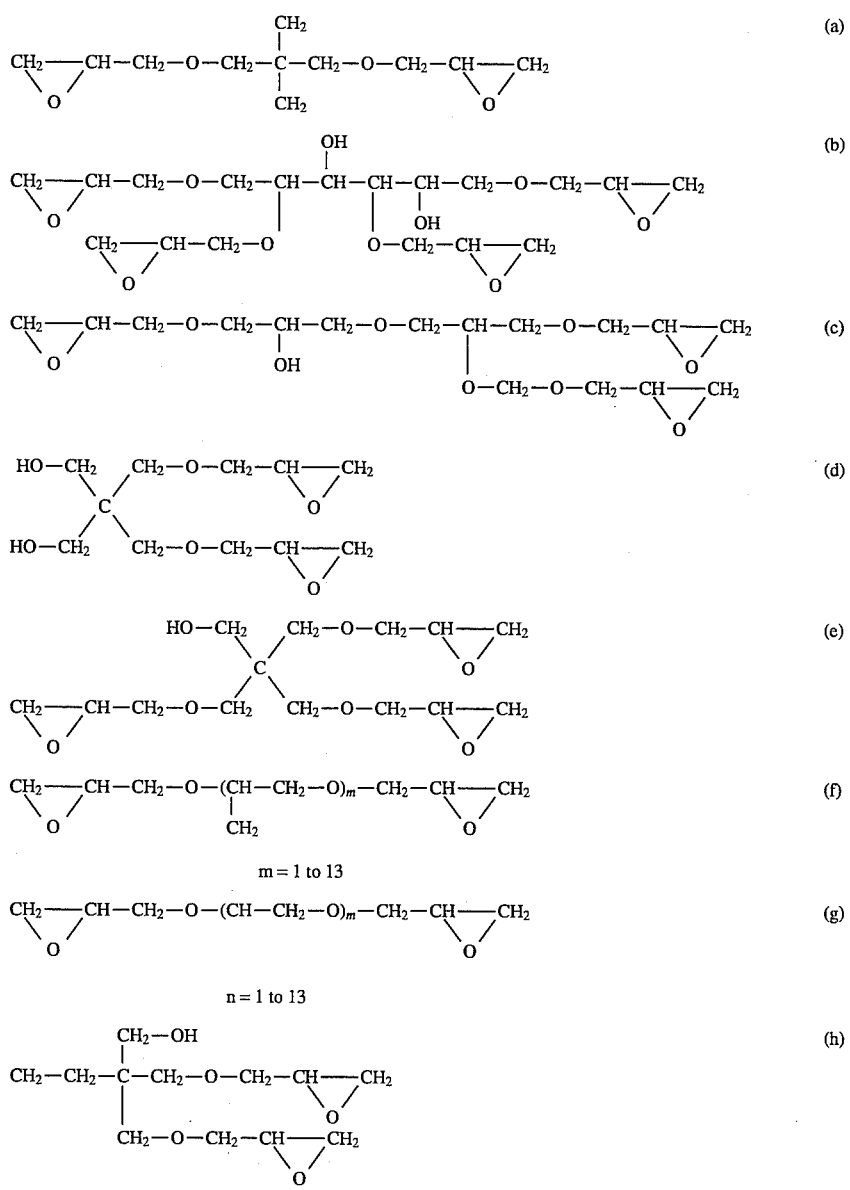

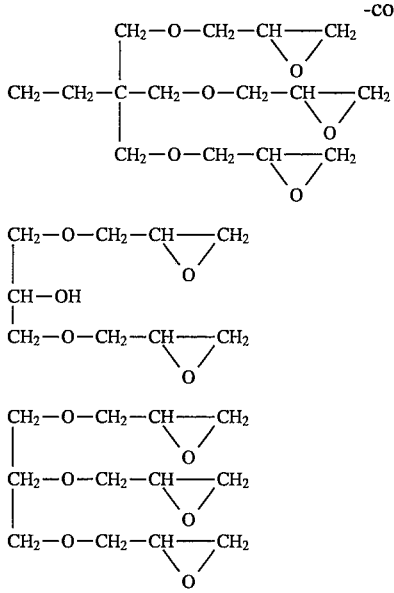

(i)

(j)

(k)

The blending ratio of the epoxy compound is preferably from 1 to 40% by weight, more preferably, from 2 to 30% by weight based on the polyurethane or polyester described above. If the ratio of the epoxy compound is less than 1% by weight, the effect for improving the water resistant adhesion can not be attained sufficiently. On the other hand, if the ratio of the epoxy compound is larger than 40% by weight, reduction is caused in the water resistant adhesion, which is assumed to due to the remaining unreacted epoxy compound.

The coating solution containing the polyurethane or polyester and the epoxy compound having two or more epoxy groups may also contain, for example, tertiary amine (including guanidine, biguanide and imidazole containing a tertiary amino group), boron complex salt, Lewis acid, inorganic acid, short chain amide, dihydrazide or titanate ester as a catalyst, in order to improve the reactivity of the epoxy group.

The content of the water soluble or water dispersible resin in the coating solution is preferably from 20 to 100% by weight.

The coating solution in the present invention may contain methylol or alkylol urea compounds, melamine compounds, guanamine compounds, acrylamide compounds or polyamide compounds, epoxy compound, azylidine compound, block polyisocyanate, silane coupling agent, titanium coupling agent, zirco-aluminate coupling agent, vinyl compound reactive by heat, peroxide or light and photosensitive resin as a crosslinking agent for the improvement of the stickiness (blocking), water proofness, solvent resistance and mechanical strength of the coating layer. Further, it may contain silica, silica sol, alumina, alumina sol, zirconium sol, kaolin, talc, calcium carbonate, titanium oxide, barium salt, carbon black, molybdenum sulfide or antimony oxide sol in such an amount as to provide the coating layer with a surface roughness within a range described later as inorganic fine particles for the improvement of the stickiness and slipping property.

Further, the coating solution may contain, as required, defoaming agent, coating improver, viscosity improver, antistatic agent, organic lubricant, organic polymer particle, antioxidant, UV-ray absorber, foaming agent, dye, pigment or the like. Further, the coating solution may contain, in addition to the water soluble or water dispersible resin, a different kind of polymer such as polyurethane, polyester, acryl resin or vinyl resin for the improvement of the characteristics of the coating solution or coating layer.

The medium for the coating solution may include water and a mixed solvent of water and an organic solvent, and water is preferred in view of safety and sanitation. The organic solvent may include methanol, ethanol, isopropyl alcohol, n-butanol, ethylene glycol, propylene glycol, methyl cellosolve, ethyl cellosolve, n-butyl cellosolve, dioxane, tetrahydrofuran, ethyl acetate, methyl ethyl ketone and n-methylpyrrolidone.

As the method of coating the above-mentioned coating solution on the polyester film, there can be mentioned a method of coating a coating solution to an unstretched polyester film and then successively or simultaneously biaxially stretching the coated film; a method of coating the coating solution to a monoaxially stretched polyester film and then stretching the coated film in the direction perpendicular to the previous monoaxial stretching direction; a method of stretching the biaxially stretched film having the coating layer again; or a method of coating a coating solution to a biaxially stretched polyester film and then further stretching the coated film in the transverse and/or machine direction, by using a reverse roll coater, a gravure coater, a load coater, an air doctor coater or other coating devices as shown in "Coating System", written by Yuji Harazaki, published from Maki Shoten in 1979.

The stretching step is conducted at a temperature, preferably of 60° to 130° C. and the stretching ratio is at least 4 times, preferably, 6 to 20 times as expressed by the area ratio. The stretched film is subjected to a heat treatment at 150° to 250° C.

Further, it is preferred to subject to relaxation by 0.2 to 20% in the machine direction and the transverse direction in the highest temperature zone for the heat treatment and/or cleaning zone at the exit of the heat treatment.

In particular, it is preferred to use such a method of coating a coating solution to a polyester film monoaxially stretched by 2 to 6 times at 60°–130° C. by a roll stretching process and, with or without appropriate drying, stretching the coated polyester film by 2 to 6 times in the direction perpendicular to the previous stretching direction at 80° to 130° C. and then subjecting to a heat treatment at 150° to 250° C. for 1 to 600 sec.

According to this method, it is possible to dry the coating layer at the same time with stretching as well as reduce the thickness of the coating layer in accordance with the stretching ratio, so that a film suitable to the polyester film substrate can be manufactured at a relatively reduced cost.

The coating solution may be applied either only one surface or both surfaces of the polyester film. In a case of single-surface coating, a different kind of coating layer may be formed on the opposite surface, as required, to provide other characteristics to the polyester film. Further, for improving the coating property and the adhesion of the coating agent to the film, a chemical treatment or electric discharging treatment may be applied to the film prior to the coating. Further, for improving the adhesion, coating property or the like of the biaxially stretched polyester film to the coating layer, an electric discharge treatment may be applied to the coating layer after forming the coating layer.

The thickness of the coating layer is preferably within a range from 0.01 to 5 μm and, more preferably, within a range from 0.02 to 1 μm. The thickness of the coating layer is preferred to be reduced also in view of the demand for reducing the size of the capacitor. However, if the thickness of the coating layer is less than 0.01 μm, it is difficult to obtain a uniform coating layer and, accordingly, coating unevenness tends to be caused to the product which is not undesirable.

The thickness of the polyester film as the substrate is preferably in a range from 0.5 to 30 μm, more preferably from 0.8 to 15 μm. The thickness of the polyester film is preferred to be thinner in view of the demand for reducing the size of the capacitor. However, an extremely thinner polyester film is not preferred due to poor workability and poor handling property.

In the coating layer formed as described above, the contact angle of water droplet is preferably not less than 60°. If the contact angle of droplet is less than 60°, the water resistant adhesion with the vapor-deposited metal film is sometimes insufficient. Accordingly, the amount of the hydrophilic group, the amount of the emulsifier and the amount of the hydrophilic compound in the coating agent is preferred to be so selected that the contact angle of water droplet against the coating layer may be not less than 60°.

Further, it is necessary that the average center line surface roughness (Ra) at the surface of the coating layer is within a range from 0.005 to 0.5 μm, preferably, within a range from 0.02 to 0.3 μm. If Ra is less than 0.005 μm, the slipping property film is insufficient to worsen the operability. On the other hand, if Ra exceeds 0.5 μm, the surface is too roughened to deteriorate the dielectric strength. Further, it is neither preferred also in view of the demand for the increase of the capacitance and reduction of the size of the capacitor.

In the present invention, as the metal to be vapor deposited, there can be mentioned aluminum, palladium, zinc, nickel, silver, copper, gold, indium, tin, stainless steel, chromium and titanium, and most preferred metal is aluminum. The metal mentioned above also includes metal oxides. The thickness of the vapor-deposited metal film or layer is preferably within a range from 10 to 5000 Å.

Vapor deposition is generally conducted by vacuum vapor deposition but it may be applied by a method such as electroplating or sputtering.

The vapor-deposited layer may be formed on one surface or on both surfaces of the polyester film, and surface treatment or film coating treatment with other resin to the vapor-deposited metal layer may be applied.

Two metallized polyester films obtained in this way are stacked and wound or a plurality of the films are stacked to prepare a capacitor element and then applied, for example, with hot press, taping, metallikon, voltage treatment, sealing at both end faces, attaching of lead wires in accordance with the customary manner to fabricate a capacitor.

The present invention will now be described more specifically by way of examples but the invention is not restricted only to the following examples unless it goes beyond the scope of the present invention.

Evaluation methods used in the examples are shown below.

(1) Average Center line surface roughness (Ra)

Ra was determined as below by using a surface roughness meter (SE-3F) manufactured by Kosaka Kenkyusho Co. A portion of a reference length L (2.5 mm) was sampled out from a cross sectional curve of a coated film along the direction of the center line. The curve was expressed as the roughness curve y=f(x) by assuming the center line of the sampling part as x-axis and the direction perpendicular to x-axis as y-axis. The value calculated from the following formula was represented by μm as the average surface roughness of the film. The average center line surface roughness was obtained by determining ten cross sectional curves from the surface of the coated film and expressing by an average value of center line surface roughnesses for the sampled portions determined from the cross sectional curves. The radius of the feeler was 2 μm, the load was 30 mg and the cut off values was 0.8 mm.

$$Ra = \frac{1}{L} \int_0^L |f(x)| dx$$

(2) Contact angle of water droplet

A contact angle against the surface of a coating layer at a temperature of 23° C. and a humidity of 50% RH with distilled water was measured by using a contact angle gauge (CA-DT-A type, manufactured by Kyowa Kaimen Kagaku Co.). The contact angle was measured for three specimens each on two points in right and left part, that is, six points in total and an average value was determined as the contact angle.

The diameter of a water droplet was set to 2 mm and the value one min after the dropping was read.

(3) Evaluation for Adhesion

After laminating a polyester film of a thickness identical with that of a substrate polyester film to the surface of a vapor-deposited thin metal layer of a metallized film by means of a usual dry lamination method, aging treatment was applied. The resultant laminate was shaped into a rectangular form of 15 mm width and immersed in a hot water at 50° to 55° C. for 30 min (boiling treatment).

The end of the specimen applied with the boiling treatment was partially peeled, and the specimen was further subjected to T-peeling at a speed of 100 mm/min by using a peeling tester to measure the load required to peel off. The T-peeling was further carried out applying water on the peeling portion. The evaluation standard for adhesion was as shown below.

o: 100 g < peeling load
Δ: 10 g ≦ peeling load ≦ 100 g
x: peeling load ≦ 10 g (4) Dielectric strength Measurement was conducted in accordance with JIS (Japanese Industrial Standard) C-2319

The voltage was increased at a rate of 100 V/sec in an atmosphere at a temperature of 23° C. and a humidity of 50% RH by using a 10 kV DC dielectric strength tester, and voltage at which the metallized film was broken to cause short-circuit was read.

(5) Change of the static capacitance

A capacitor was left in an atmosphere at a temperature of 60° C. and a humidity of 95% RH for 1000 hours and the change was determined as the rate of change in static capacitance based on the initial static capacitance as a reference value.

(6) Glass transition point (Tg)

Measurement was made by using a differential scanning calorimeter SSC580 DSC20 type manufactured by Seiko Denshi Kogyo Co. The measuring conditions of DSC were as shown below. Namely, 10 mg of a previously frozen-dry specimen was set to the DSC device, heated to a temperature of 200° C. at a rate of 10° C./min, quenched by liquid nitrogen and then heated again to a range from −50° C. to 200° C. at a rate of 10° C./min and the glass transition point was measured. The glass transition point was detected when the DSC curve was bent by the change of the specific heat and the base line was moved in parallel. A crossing point between a tangential line for the base line at a temperature lower than the bending point and a tangential line at a point of the bent portion with the greatest gradient is defined as the starting point for the bending and the temperature at the starting point was determined as the glass transition point.

(7) Blocking resistance

A surface of a coating layer of a polyester film and another polyester film with no coating layer were stacked to each other and pressing was applied at a temperature of 40° C., a relative humidity of 80% RH and under a load of 10 kg/cm² for 20 hours. The specimen after the above-mentioned treatment was visually evaluated based on the following standards for the judgment.

o: no blocking at all

Δ: partial blocking

×: blocking for not less than 50% portion

EXAMPLE 1

100 parts of dimethyl terephthalate, 70 parts of ethylene glycol and 0.11 parts of calcium acetate monohydrate were charged in a reactor and heated to an elevated temperature while distilling off methanol to conduct ester interchange reaction. The temperature was elevated to 230° C. in about 4 hours after starting the reaction to substantially complete the ester interchange reaction.

Subsequently, a solution prepared by dissolving 0.065 parts of triethyl phosphite and 0.30 parts of triethyl phosphate in ethylene glycol was added to the reaction mixture, to which 0.04 parts of antimony trioxide was added and the temperature was elevated to 238° C. in 10 min.

Then, polycondensation reaction was conducted by a customary method to obtain a polyethylene terephthalate (A) with an intrinsic viscosity of 0.66 after 4 hours.

The polyester contained 0.23% by weight of deposited particles containing elemental calcium and elemental phosphorous by 6.4% and 6.5% by weight respectively. The average particle size was 1.2 μm.

On the other hand, a polyethylene terephthalate (B) containing 1.0% by weight of calcium carbonate with an average particle size of 1.6 μm was prepared. Namely, after conducting an ester interchange reaction in the same manner as in the preparation for the polyester (A), 0.036 parts of phosphoric acid and 0.04 parts of antimony trioxide were added, to which a predetermined amount of calcium carbonate was added and polycondensation reaction was conducted by a customary method. A polyester (B) with an intrinsic viscosity of 0.65 was obtained after 4 hours.

Subsequently, after blending 90 parts of the polyester (A) and 10 parts of the polyester (B), they were extruded into a sheet from an extruder at 290° C. and then quenched to obtain an amorphous sheet. After stretching the resultant sheet at 95° C. in the machine direction by 4.2 times, a coating solution comprising 80 parts (weight for solid content, here and hereinafter) of a polyester polyurethane having isophorone diisocyanate (trade name Hydran AP-40, manufactured by Dainippon Ink Chemical Industry Co.) and 20 parts of a water dispersible polyester (trade name: Polyester WR-961, manufactured by Nippon Gosei Kagaku Kogyo Co.) and using water as a medium was coated on one surface of the film. Then the coated film was stretched at 110° C. in the transverse direction by 3.9 times and then subjected to a heat treatment at 230° C. to obtain a biaxially stretched polyester film with the thickness of the coating layer of 0.04 μm and the thickness of the polyester film substrate of 2.2 μm.

The contact angle of water droplet against the coating layer was 63° and the average center line surface roughness (Ra) was 0.020 μm.

Aluminum was vapor deposited to a thickness of 450 Å on the coating surface of the resultant film by using a resistance heating type metallizing apparatus under a pressure in the vacuum chamber of lower than $10^{-4}$ Torr.

The resultant vapor-deposited film had an excellent adhesion in the adhesion evaluation test.

Two vapor-deposited films were stacked and wound and attached with electrodes to prepare a film capacitor of 0.1 μF capacitance.

As shown in Table 1, the resultant metallized film capacitor was excellent in dielectric strength characteristic, with less change in the static capacitance and excellent in the moist heat resistance.

Results of experiments and comparative experiments described later are also shown collectively in Table 1.

Comparative Example 1

A metallized polyester film capacitor was prepared in the same procedures as those in Example 1 except for not coating a coating solution as used in Example 1.

The resultant capacitor was inferior with respect to the moist heat resistance characteristic as compared with Example 1.

EXAMPLE 2

A polyester polyol comprising 664 parts of terephthalic acid, 631 parts of isophthalic acid, 472 parts of 1,4-butanediol and 447 parts of neopentyl glycol was obtained, to which 321 parts of adipic acid and 268 parts of dimethylolpropylenic acid were added to obtain a polyester polyol (C) having pendant carboxyl groups.

A polyester polyurethane (D) was prepared by adding 160 parts of tolylene diisocyanate to 1880 parts of the polyester polyol (C).

A metallized polyester film was obtained in the same procedures as those in Example 1 except for blending 80 parts by weight of the polyester polyurethane (D) as described above instead of Hydran AP-40 in Example 1.

Comparative Example 2

A metallized polyester film was obtained in the same procedures as those in Example 1 except for coating a coating solution comprising 70 parts of a surface active agent—forced-emulsion type polyurethane aqueous dispersion (trade name Superflex 4000, manufactured by Daiichi Kogyo Seiyaku Co.), 10 parts of polyoxyethylene nonyl phenyl ether and 20 parts of the Polyester WR-961 manufactured by Nippon Gosei Kagaku Kogyo Co. and using water as the medium on one surface of the film.

In the coating layer of Comparative Example 2, the contact angle of water droplet against the coating layer was as low as 57° due to the surface active agent and the adhesion between the polyester film and vapor-deposited metal layer was also poor.

A capacitor obtained in the same procedures as those in Example 1 by using the metallized polyester film was poor in the moist heat resistance characteristic.

EXAMPLE 3

A polyethylene terephthalate containing 0.1 parts of silica with an average particle size of 0.1 μm was extruded into a sheet through an extruder at a temperature of 290° C. and quenched to obtain an amorphous sheet. After stretching the resultant sheet in the machine direction by 4.2 times, a coating solution comprising 80 parts of AP-40, 15 parts of WR-961 and 5 parts of silica sol with an average particle size of 0.06 μm and using water as a medium was coated and, subsequently, a metallized polyester film capacitor was obtained in the same procedures as those in Example 1.

Comparative Example 3

A polyester film was obtained in the same procedures as those in Example 3 excepting for not coating the coating solution as used in Example 3.

The film had an average center line surface roughness of 0.002 μm and the winding operability was poor because of poor slipping property and could not be served to practical use.

4 hours after starting the reaction to substantially complete the ester interchange reaction. Subsequently, 0.065 parts of triethyl phosphite and 0.30 parts of triethyl phosphate were added to the reaction mixture, to which 0.04 parts of antimony trioxide was further added and polycondensation reaction was conducted to obtain a polyester (A) with an intrinsic viscosity of 0.66 after 4 hours.

A polyester (B) containing 1.0% by weight of calcium carbonate with an average particle size of 1.6 μm was obtained in the same procedures as those in the preparation of the polyester (A) except for adding the calcium carbonate.

On the other hand, 100 parts of dimethyl isophthalate, 15 parts of dimethyl sebacate, 6 parts of sodium dimethyl-5-sulfoisophthalate, 80 parts of ethylene glycol and 0.041 parts of manganese acetate tetrahydrate were heated to an elevated temperature while distilling off methanol to conduct ester interchange reaction. The temperature was elevated to 230° C. in 4 hours after starting the reaction to substantially complete the ester interchange reaction. Then, 0.005 parts of phosphoric acid was added to the reaction mixture, to which 0.04 parts of antimony trioxide was further added and a polycondensation reaction was conducted to obtain a copolyester (E) with an intrinsic viscosity of 0.50 after 4 hours. The glass transition point of the resultant copolyester (E) was 38° C. 180 parts of water was added under vigorous stirring to a solution comprising 20 parts of the copolyester (E) dissolved in 80 parts of tetrahydrofuran to obtain an aqueous dispersion of copolyester (E).

Then, after blending 90 parts of the polyester (A) and 10 parts of the polyester (B), they were melt-extruded at 290° C. into an amorphous sheet, stretched in the machine direction at 90° C. by 4.2 times and then the aqueous dispersion of the copolyester (E) was coated on one surface of the film, which was then stretched in the transverse direction at 110° C. by 3.9 times and subjected to a heat treatment at 230° C. to obtain a biaxially stretched polyester film with a thickness of the coating layer of 0.04 μm and the thickness of the substrate polyester film of 4 μm. The contact angle of water droplet against the coating layer was 63° and the average central line surface roughness (Ra) was 0.20 μm. Aluminum was vapor deposited to a thickness of 450 Å on the coating

TABLE 1

| | Substrate film | | | Vapor-deposited film Adhesion | Capacitor | |
|---|---|---|---|---|---|---|
| | Coating layer | Ra (μm) | Contact angle | | Dielectric strength (kV/μm) | Rate of change in capacitance (%) |
| Example 1 | Provided | 0.020 | 63° | o | 0.56 | 0.9 |
| Comparative Example 1 | Not provided | 0.021 | 66° | x | 0.55 | 3.8 |
| Example 2 | Provided | 0.021 | 63° | o | 0.56 | 0.8 |
| Comparative Example 2 | Provided | 0.025 | 56° | x | 0.55 | 3.2 |
| Example 3 | Provided | 0.025 | 62° | o | 0.60 | 1.0 |
| Comparative Example 3 | Not provided | 0.002 | 66° | x | — | — |

EXAMPLE 4

100 parts of dimethyl terephthalate, 70 parts of ethylene glycol and 0.11 parts of calcium acetate monohydrate were charged in a reactor and heated to an elevated temperature while distilling off methanol to conduct ester interchange reaction. The temperature was elevated to 230° C. in about surface of the resultant film by using a resistance heating type metallizing apparatus under a pressure in a vacuum chamber of not higher than $10^{-4}$.

The resultant vapor-deposited film had an excellent adhesion in the evaluation for the adhesion. Two vapor deposited films were stacked and wound and applied with electrodes to form a film capacitor of 0.1 μF.

As shown in Table 2, the resultant metallized film capacitor was excellent in dielectric strength characteristics, with less change in the static capacitance and excellent in the moist heat resistance characteristics.

Comparative Example 4

A metallized polyester film capacitor was obtained in the same procedures as those in Example 4 except for not coating the coating solution as used in Example 4.

EXAMPLE 5

A metallized polyester film capacitor was obtained in the same manner as in Example 4 except for coating an aqueous dispersion of the copolyester (F) comprising 100 parts of dimethyl terephthalate, 20 parts of sodium dimethyl-5-sulfoisophthalate and 80 parts of ethylene glycol instead of the aqueous dispersion of the copolyester (E) in Example 4.

Comparative Example 5

A metallized polyester film capacitor was obtained in the same procedures as those in Example 4 except for coating an aqueous dispersion of the copolyester (G) comprising 100 parts of dimethyl terephthalate, 20 parts of sodium dimethyl-5-sulfoisophthalate and 80 parts of cyclohexane dimethanol instead of the aqueous dispersion of the copolyester (E) in Example 4.

EXAMPLE 6

After blending 90 parts of the polyester (A) and 10 parts of the polyester (B), they were melt-extruded into an amorphous sheet at 290° C., stretched in the machine direction at 90° C. by 4.2 times, then stretched in the transverse direction at 110° C. by 3.9 times and subjected to a heat treatment at 230° C. to obtain a biaxially stretched polyester film with a thickness of 4 μm. A coating solution of 90 parts of TP-236 (Tg: 60° C.) which was a copolyester manufactured by Nippon Gosei Co. and 10 parts of Coronate which was a polyisocyanate manufactured by Nippon Polyurethane Co. in a mixed solvent comprising methyl ethyl ketone and toluene was coated on the substrate polyester film. The thickness of the coating layer after drying was 0.1 μm.

From the resultant polyester film, a metallized polyester film capacitor was obtained in the same procedures as those in Example 4.

EXAMPLE 7

A metallized polyester film capacitor was obtained in the same procedures as those in Example 6 except for using a coating solution blended with SP-131 (Tg: −20° C.) which was a copolyester manufactured by Nippon Gosei Co. in place of TP-236 used in Example 6.

The resultant metallized polyester film capacitor had satisfactory moist heat resistance but the polyester film having the above-mentioned coating layer was slightly insufficient in the slipping property.

Comparative Example 6

After melt-extruding a polyethylene terephthalate containing 0.1 parts of silica with an average particle size of 0.1 μm into an amorphous sheet at 290° C., it was stretched in the machine direction at 90° C. by 4.2 times and then an aqueous dispersion of the copolyester (E) was coated on one surface of the film. Then a polyester film was obtained in the same procedures as those in Example 4. The average center line surface roughness of the film was 0.002 μm and since the slipping property was poor, the winding operability was poor and the film could not be served practical use.

EXAMPLE 8

A polyester film having a coating layer was obtained in the same procedures as those in Comparative Example 6, excepting for using a coating solution comprising 95 parts of an aqueous dispersion of the copolyester (E) and 5 parts of an aqueous dispersion of silica sol with an average particle size of 0.06 μm instead of the aqueous dispersion of the copolyester (E) in Comparative Example 6.

By using the polyester film thus obtained, a metallized polyester film capacitor was obtained in the same procedures as those in Example 4.

TABLE 2

|  | Tg of coating agent (°C.) | Surface characteristics of coating layer | | Characteristics of vapor deposition | Characteristics of capacitor | |
| --- | --- | --- | --- | --- | --- | --- |
|  |  | Ra (μm) | Contact angle | Adhesion | Dielectric strength (kV/μm) | Rate of change in capacitance (%) |
| Example 4 | 38 | 0.020 | 62° | o | 0.56 | 0.9 |
| Comparative Example 4 | — | 0.020 | 66° | x | 0.55 | −12.0 |
| Example 5 | 41 | 0.021 | 57° | Δ | 0.56 | −2.9 |
| Comparative Example 5 | 80 | 0.025 | 57° | x | 0.55 | −10.9 |
| Example 6 | 60 | 0.020 | 64° | o | 0.55 | 0.5 |
| Example 7 | −20 | 0.018 | 64° | o | 0.54 | 0.8 |
| Comparative Example 6 | 38 | 0.002 | 62° | — | — | — |
| Example 8 | 38 | 0.025 | 61° | o | 0.60 | 0.6 |

EXAMPLE 9

100 parts of dimethyl terephthalate, 70 parts of ethylene glycol and 0.11 parts of calcium acetate monohydrate were charged in a reactor and heated to an elevated temperature while distilling off methanol to conduct ester interchange reaction. The temperature was elevated to 230° C. in about 4 hours after starting the reaction to substantially complete the ester interchange reaction. Subsequently, 0.065 parts of triethyl phosphite, 0.30 parts of triethyl phosphate were added to the reaction mixture, to which 0.04 parts of antimony trioxide was further added and polycondensation reaction was conducted to obtain a polyester (A1) with an intrinsic viscosity of 0.66 after 4 hours.

A polyester (A2) containing 1.0% by weight of calcium carbonate with an average particle size of 1.6 μm was obtained in the same manner as the preparation for the polyester (A), excepting for adding the calcium carbonate.

On the other hand, 20 parts of dimethyl terephthalate, 80 parts of dimethyl isophthalate, 25 parts of dimethyl sebacate, 6 parts of sodium dimetyl-5-sulfoisophthalate, 80 parts of ethylene glycol and 0.041 parts of manganese acetate tetrahydrate were heated at an elevated temperature while distilling off methanol to conduct ester interchange reaction. The temperature was elevated to 230° C. in 4 hours after the starting the reaction to substantially complete the ester interchange reaction. Subsequently, 0.005 parts of phosphoric acid was added to the reaction mixture, to which 0.04 parts of antimony trioxide was further added to conduct polycondensation reaction and a copolyester with an intrinsic viscosity of 0.50 was obtained after 4 hours. After adding 180 parts of water under high speed stirring to a solution of 20 parts of the resultant copolyester in 80 parts of tetrahydrofuran, tetrahydrofuran was removed by evaporation under heating to obtain an aqueous dispersion of a copolyester (A3).

On the other hand, 51 parts of ethyl acrylate, 40 parts of methyl methacrylate, 9 parts of methacrylic acid, 0.5 parts of dodecyl mercaptan and 0.25 parts of sodium lauryl sulfate dissolved in one part of water were homogeneously mixed by a blender to obtain a monomer emulsion. The monomer emulsion and 0.8 parts of ammonium persulfate dissolved in 1.5 parts of water were separately dropped into 187 parts of water at a temperature of 75° C. to conduct reaction, while maintaining the reaction temperature at 75° to 85° C. After the dropping was over, an aqueous 28% ammonia was added therein to adjust the pH to 7.5 while maintaining the temperature at 80° C. for further 3 min, and aged for 30 min to obtain a polyacrylic aqueous dispersion (B1).

Then, after blending 90 parts of the polyester (A1) and 10 parts of the polyester (A2), they were melt-extruded into an amorphous sheet at 290° C., stretched in the machine direction at 90° C. by 4.2 times. A coating agent comprising 80 parts of the aqueous dispersion of the copolyester (A3) and 20 parts of the polyacrylic aqueous dispersion (B1) was coated on one surface of the film and, subsequently, stretched in the transverse direction by 3.9 times at 110° C. and subjected to a heat treatment at 230° C. to obtain a biaxially stretched polyester film with the thickness of a coating layer of 0.04 μm and the thickness of the substrate polyester film of 4 μm.

The resultant film had a contact angle of water droplet against the coating layer of 63° and the average center line surface roughness (Ra) of 0.020 μm.

Aluminum was vapor deposited to a thickness of 450 Å on the coating surface of the resultant film by using a resistance heating type metallizing apparatus under a pressure in a vacuum chamber of not higher than $10^{-4}$ Torr.

The resultant vapor deposited film had an excellent adhesion in the evaluation test for the adhesion.

Two vapor-deposited films were stacked to each other and wound, and attached with electrodes to manufacture a film capacitor of 0.1 μF capacitance.

As shown in Table 3, the resultant metallized film capacitor was excellent in dielectric strength characteristics, with less change of the static capacitance and excellent in the moist heat resistance characteristics.

EXAMPLE 10

An aqueous dispersion of a polyester comprising 50 mol % of terephthalic acid, 40 mol % of isophthalic acid and 10 mol % of disodium sulfoisophthalate as the dicarboxylic acid component and 67 mol % of ethylene glycol and 33 mol % of diethylene glycol as the glycol component was sufficiently displaced with nitrogen gas, and was dissolved acrylamide thereinto. To the mixture, ammonium cerium nitrate was further added as a polymerization initiator and stirred under a nitrogen atmosphere to obtain an aqueous dispersion of the reaction product (C1) at a ratio of 70 parts of polyester and 30 parts of polyacryl amide.

A metallized polyester film capacitor was prepared in the same procedures as those in Example 9, except for coating 100 parts of the aqueous dispersion (C1) instead of the coating solution used in Example 9.

EXAMPLES 11 TO 13

Metallized polyester film capacitors were obtained in the same procedures as those in Example 9, except for using a coating solution of a blend composition shown in Table 3 instead of the coating solution used in Example 9.

Comparative Example 7

A metallized polyester film capacitor was obtained in the same procedures as those in Example 9, except for using no coating solution. The resultant capacitor was poor in the moist heat resistant characteristics as compared with Example 9.

Comparative Example 8

A polyester film having a coating layer was obtained in the same procedures as those in Example 9, except for coating 100 parts of the copolyester aqueous dispersion (A3) instead of the coating solution used in Example 9. The resultant polyester film partially caused blocking and was poor in the operability.

EXAMPLE 14

A metallized polyester film capacitor was obtained in the same procedures as those in Example 9, except for blending 80 parts of an aqueous dispersion (A4) of a copolyester comprising 100 parts of dimethyl terephthalate, 25 parts of sodium dimetyl-5-sulfoisophthalate and 80 parts of ethylene glycol into a coating solution instead of the copolyester aqueous dispersion (A3) used in Example 9.

Comparative Example 9

A polyethylene terephthalate containing 0.1 parts of silica with an average particle size of 0.1 μm was melt-extruded at 290° C. into an amorphous sheet, stretched in the machine direction by 4.2 times at 90° C. A coating solution comprising 80 parts of the copolyester aqueous dispersion (A3) and 20 parts of the polyacrylic aqueous dispersion (B1) was coated on one surface of the film and then a polyester film was obtained in the same procedures as those in Example 9. The film had an average center line surface roughness of 0.002 μm and since the slipping property was poor, the winding operability was poor and could not be served for practical use.

EXAMPLE 15

A polyester film having a coating layer thereon was obtained in the same procedures as those in Comparative Example 9, except for using a coating solution comprising 75 parts of the copolyester aqueous dispersion (A3), 20 parts of the polyacrylic aqueous dispersion (B1) and 5 parts of an aqueous dispersion of silica sol with an average particle size of 0.06 μm (S1) instead of the coating solution used in Comparative Example 9.

By using the polyester film thus obtained, a metallized polyester film capacitor was obtained in the same procedures as those in Example 9.

The obtained results are collectively shown in the following Tables 3 and 4.

TABLE 3

| | Composition of coating | Characteristics of coating layer | | |
|---|---|---|---|---|
| | solution A3/A4/B1/C1/S1 | Ra (μm) | Contact angle | Blocking resistance |
| Example 9 | 80/0/20/0/0 | 0.020 | 63° | o |
| Example 10 | 0/0/0/100/0 | 0.021 | 63° | o |
| Example 11 | 60/0/20/20/0 | 0.021 | 62° | o |
| Example 12 | 60/0/0/40/0 | 0.023 | 62° | o |
| Example 13 | 0/0/20/80/0 | 0.021 | 62° | o |
| Example 14 | 0/80/20/0/0 | 0.020 | 57° | o |
| Example 15 | 75/0/20/0/5 | 0.025 | 61° | o |
| Comparative Example 7 | 0/0/0/0/0 | 0.020 | 66° | o |
| Comparative Example 8 | 100/0/0/0/0 | 0.023 | 62° | Δ |
| Comparative Example 9 | 80/0/20/0/0 | 0.002 | 62° | o |

TABLE 4

| | Characteristics of capacitor | | |
|---|---|---|---|
| | Adhesion of vapor-deposited layer | Dielectric strength (kV/μm) | Rate of change in capacitance |
| Example 9 | o | 0.57 | 0.9 |
| Example 10 | o | 0.56 | 0.9 |
| Example 11 | o | 0.56 | 0.7 |
| Example 12 | o | 0.56 | 0.9 |
| Example 13 | o | 0.56 | 0.8 |
| Example 14 | o | 0.55 | −2.8 |
| Example 15 | o | 0.60 | 0.6 |
| Comparative Example 7 | x | 0.55 | −15.0 |
| Comparative Example 8 | o | 0.55 | 0.9 |
| Comparative Example 9 | — | — | — |

EXAMPLE 16

A polyethylene terephthalate with an intrinsic viscosity of 0.62 was extruded from an extruder at a temperature of 280° to 300° C. and cast on a cooling drum while using an electrostatic contact method to obtain an amorphous polyester sheet with a thickness of about 150 μm.

After stretching the above-mentioned sheet in the machine direction by 3.5 times at 95° C., a coating solution comprising 80 parts of a water dispersible polyurethane having carboxyl groups (trade name: Hydran AP-40, manufactured by Dainippon Ink Kagaku Kogyo Co.), 20 parts of triethylene glycol diglycidyl ether and water as the medium was coated on both surfaces of the film. The coated film was further stretched in the transverse direction by 3.5 times at 110° C. and then subjected to a heat treatment at 230° C., to obtain a biaxially stretched polyester film with the thickness of the coating layer of 0.1 μm and the thickness of the substrate polyester film of 12 μm. The contact angle of water droplet against the coating layer was 63°.

Aluminum was vapor deposited to a thickness of 450 Å on one surface of the above-mentioned film by using a resistance heating type metallizing apparatus under a pressure in a vacuum chamber of not higher than $10^{-4}$ Torr.

The resultant vapor-deposited film showed excellent adhesion as shown in Table 5.

Comparative Example 10

A metallized polyester film was obtained in the same procedures as those in Example 16, except for not coating the coating solution used in Example 16.

The resultant film was poor in the adhesion between the vapor-deposited metal layer and the polyester substrate film as compared with Example 16.

TABLE 5

| | Adhesion [g/15 mm width] | | | | |
|---|---|---|---|---|---|
| | No boiling treatment | | With boiling treatment | | |
| | Not applying water | With applying water | Not applying water | With applying water | Contact angle |
| Example 16 | 310 | 185 | 200 | 180 | 63° |
| Comparative Example 10 | 90 | 10 | 30 | 0 | — |

What is claimed is:

1. A metallized polyester film capacitor element produced by winding metallized polyester films into a roll or stacking a plurality of metallized polyester films, the metallized polyester film being produced by the steps of:

coating a coating solution, containing a non-particulate resin as the main ingredient, onto at least one surface of a polyester film, to obtain a film having a coating layer on at least one surface of the film, the average centerline surface roughness (Ra) of the coating layer being adjusted to be in the range from 0.005 to 0.5 μm by particles contained in at least one of the polyester film and the coating layer; and vapor-depositing a metal on the surface of the coating layer to obtain the metallized polyester film, wherein the resin is selected from the group consisting of:
a polyester polyurethane,
a resin mainly comprising a polyester type resin with a glass transition point (Tg) of not higher than 70° C.,
a resin comprising a polyester component and an acryl component,
a resin comprising a polyurethane or polyester and an epoxy resin, and wherein a contact angle of a water droplet against the coating layer is not less than 60°.

2. A capacitor element as defined in claim 1, wherein the thickness of the coating layer is 0.01 to 5 µm.

3. A capacitor element as defined in claim 2, wherein the thickness of a vapor-deposited metal layer is 10 to 5000 Å.

4. A capacitor element as defined in claim 1, wherein the thickness of a vapor-deposited metal layer is 10 to 5000 Å.

5. A capacitor element as defined in any one of claims 1 to 3, wherein the coating layer is formed at least on one surface of the polyester film by coating the coating solution at least on one surface of the polyester film, by stretching the resultant coated film at least in one direction selected from machine and transverse directions and by heat setting.

6. A capacitor element as defined in claim 1, wherein the polyester film contains the particles.

7. A capacitor element as defined in claim 1, wherein the coating layer contains the particles.

8. A capacitor element as defined in claim 1, wherein the coating layer contains inorganic particles.

9. A capacitor element as claimed in claim 1, wherein the resin forming the coating layer is selected from the group consisting of:

a polyester polyurethane, a resin comprising a polyester component and an acryl component, and a resin comprising a polyurethane or polyester and an epoxy resin.

10. A capacitor element as claimed in claim 1, wherein the resin forming the coating layer is water-soluble or water-dispersible.

* * * * *

UNITED STATES PATENT AND TRADEMARK OFFICE
CERTIFICATE OF CORRECTION

PATENT NO. :   5,581,435

DATED      :   DECEMBER 3, 1996

INVENTOR(S):   Shin-Ichi Kinoshita and Naohiro Takeda

It is certified that error appears in the above-identified patent and that said Letters Patent is hereby corrected as shown below:

Cover page to Patent, section [73], replace "Diafoil Company, Limited" with --Diafoil Hoechst Co., Ltd--.

Signed and Sealed this

Twenty-ninth Day of July, 1997

*Attest:*

BRUCE LEHMAN

*Attesting Officer*   *Commissioner of Patents and Trademarks*